(12) United States Patent
Isono (10) Patent No.: US 6,744,570 B1
(45) Date of Patent: Jun. 1, 2004

(54) TAKING LENS SYSTEM

(75) Inventor: Masashi Isono, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/425,728

(22) Filed: Apr. 30, 2003

(30) Foreign Application Priority Data

Jan. 30, 2003 (JP) ........................... 2003-022132

(51) Int. Cl.[7] .............................................. G02B 9/34
(52) U.S. Cl. ......................................... 359/772; 359/771
(58) Field of Search ............................... 359/771–772, 359/739–740, 660, 715, 676, 683, 686, 747

(56) References Cited

U.S. PATENT DOCUMENTS 3,838,911 A * 10/1974 Ikeda ........................ 359/747
4,303,314 A * 12/1981 Matsui ...................... 359/747
5,739,966 A * 4/1998 Tanaka ...................... 359/779

FOREIGN PATENT DOCUMENTS

| JP | 2000-171697 | 6/2000 |
| JP | 2002-221657 | 8/2002 |

* cited by examiner

*Primary Examiner*—Jordan M. Schwartz
(74) *Attorney, Agent, or Firm*—Burns, Doane, Swecker & Mathis, L.L.P.

(57) ABSTRACT

A taking lens system composed of four lens elements for forming an image on a solid-state sensor has, from the object side, a first lens element having a positive optical power, an aperture stop, a second lens element having a positive optical power, a third lens element having a negative optical power, and a fourth lens element having a negative optical power, and fulfills a prescribed condition.

5 Claims, 4 Drawing Sheets

FIG.5A
FNO=4.00

—— d
--- g
-·- c
-··- SC

-0.1  0.1
SPHERICAL SINE
ABERRATION CONDITION

-0.1  0.1
ASTIGMATISM

FIG.5C
Y'=4.4

-5.0  5.0
DISTORTION %

FIG.6A
FNO=4.00

—— d
--- g
-·- c
-··- SC

-0.1  0.1
SPHERICAL SINE
ABERRATION CONDITION

-0.1  0.1
ASTIGMATISM

FIG.6C
Y'=4.4

-5.0  5.0
DISTORTION %

TAKING LENS SYSTEM

This application is based on Japanese Patent Application No. 2003-022132 filed on Jan. 30, 2003, the contents of which are hereby incorporated by reference.

BACKGROUND OF THE INVENTION

1. Field of the Invention

The present invention relates to a taking lens system, and more particularly to a compact, high-performance taking lens system suitable for use in a digital input apparatus (such as a digital still camera or digital video camera) that takes in an image of a subject by means of a solid-state image sensor.

2. Description of the Prior Art

In recent years, as personal computers and the like become more and more popular, digital still cameras and digital video cameras (hereinafter collectively referred to as "digital cameras"), which permit easy entry of image data into digital equipment, have been becoming more and more popular for personal use among general users. Such digital cameras are expected to become even more widespread in the future.

Solid-state image sensors, such as CCDs (charge-coupled devices), used in digital cameras have been made increasingly small, and accordingly further miniaturization is sought in digital cameras themselves. As a result, miniaturization is eagerly sought also in taking lens systems, which occupy the largest volumes in digital input devices. The easiest way to make a taking lens system smaller is to make a solid-state image sensor smaller. However, this involves making photosensitive elements smaller, and thus makes the solid-state image sensor more difficult to fabricate, and in addition requires higher performance in the taking lens system.

On the other hand, making a taking lens system smaller while keeping the size of a solid-state image sensor unchanged inevitably brings the exit pupil position closer to the image plane. When the exit pupil position is brought closer to the image plane, the off-axial rays exiting from the taking lens system are obliquely incident on the image plane. This makes it impossible to make the most of the light-condensing ability of the microlenses provided in front of the solid-state image sensor, with the result that the obtained image shows extremely uneven brightness between in a central portion and in a peripheral portion thereof. This can be avoided by bringing the exit pupil position of the taking lens system farther away from the image plane, but this inevitably makes the taking lens system as a whole unduly large.

Furthermore, in keen competition for lower prices in recent years, lower costs have been increasingly eagerly sought in taking lens systems. Moreover, to cope with the trend toward denser and denser solid-state image sensors in recent years, increasingly high performance has been sought in taking lens systems. To meet these requirements, Japanese Patent Applications Laid-Open Nos. 2000-171697 and 2002-221657 propose taking lens systems composed of four lens elements for use with a solid-state image sensor.

However, the taking lens system proposed in Japanese Patent Application Laid-Open No. 2000-171697 mentioned above has an angle of view of about 28 degrees, which is insufficient for it to be used as a taking lens system. On the other hand, the taking lens system proposed in Japanese Patent Application Laid-Open No. 2002-221657 mentioned above has a total length roughly equal to three times its focal length, and thus is not satisfactorily compact. Moreover, this taking lens system uses as many as two glass lens elements, which unduly increase its costs.

SUMMARY OF THE INVENTION

An object of the present invention is to provide a taking lens system for use with a solid-state image sensor which is low-cost and compact but which nevertheless offers satisfactory optical performance.

To achieve the above object, according to one aspect of the present invention, a taking lens system composed of four lens elements for forming an image on a solid-state image sensor is provided with, from the object side, a first lens element having a positive optical power, an aperture stop, a second lens element having a positive optical power, a third lens element having a negative optical power, and a fourth lens element having a negative optical power. Here, the following condition is fulfilled:

$$0.5 < f/f1 < 1.6$$

where f represents the focal length of the entire taking lens system; and f1 represents the focal length of the first lens element.

According to another aspect of the present invention, a taking lens system composed of four lens elements for forming an image on a solid-state image sensor is provided with, from the object side, a front lens unit having a positive optical power, an aperture stop, and a rear lens unit. Here, the front lens unit is composed solely of a first lens element having a positive optical power, and the rear lens unit is composed of, from the object side, a second lens element having a positive optical power, a third lens element having a negative optical power, and a fourth lens element having a negative optical power. Moreover, the following condition is fulfilled:

$$-0.9 < f/fR < 0.4$$

where f represents the focal length of the entire taking lens system; and fR represents the focal length of the rear lens unit.

According to still another aspect of the present invention, a taking lens system composed of four lens elements for forming an image on a solid-state image sensor is provided with, from an object side, a first lens element having a positive optical power, an aperture stop, a second lens element having a positive optical power, a third lens element having a negative optical power, and a fourth lens element having a negative optical power. Here, the first lens element is a positive lens element convex to the object side, the second lens element is a positive meniscus lens element convex to an image side, the third lens element is a negative meniscus lens element convex to the image side, and the fourth lens element is a negative lens element concave to the image side and having an aspherical surface at least on the image side thereof

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
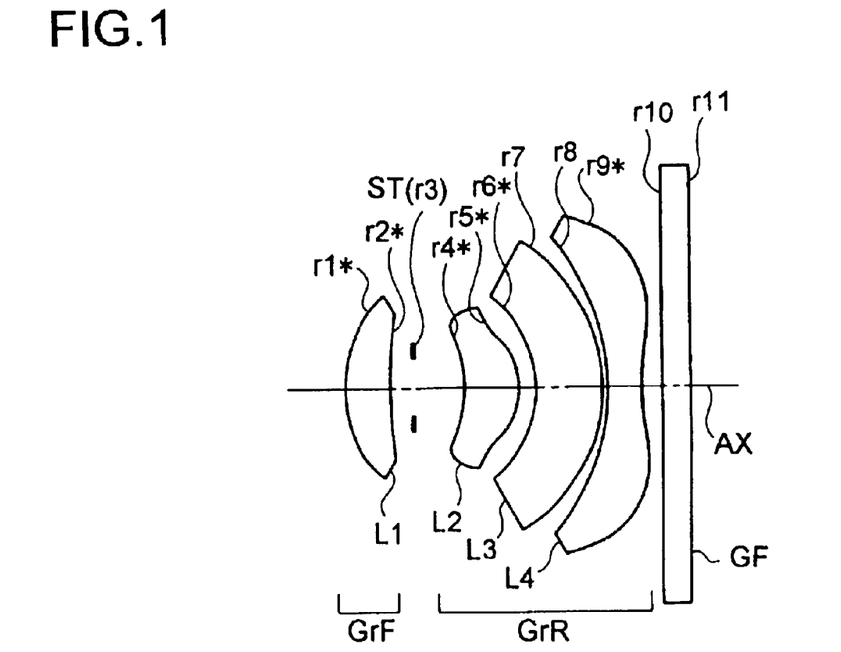
FIG. 1 is a lens construction diagram of a first embodiment (Example 1) of the invention.
Figure 2:
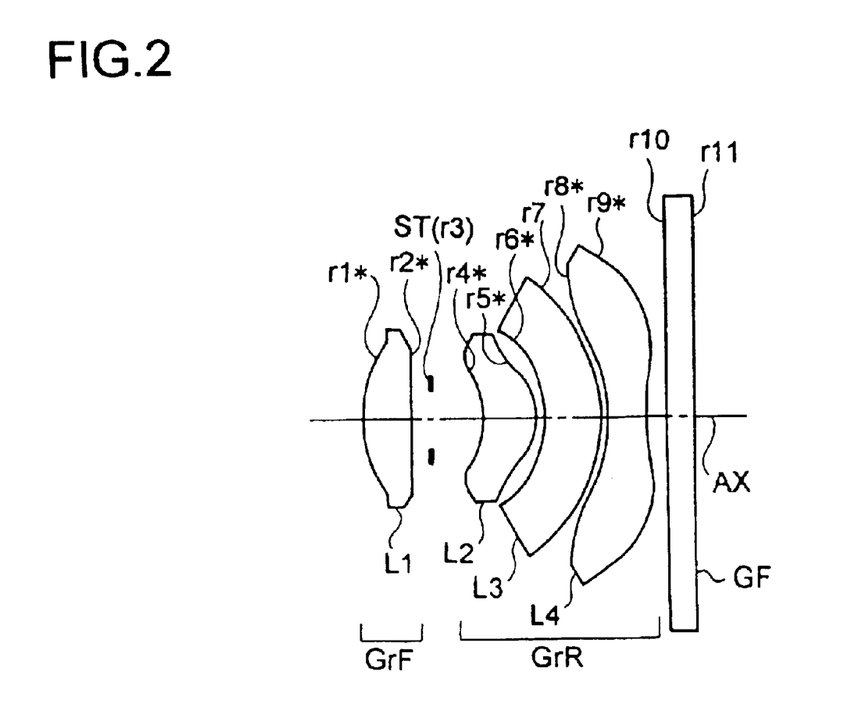
FIG. 2 is a lens construction diagram of a second embodiment (Example 2) of the invention.
Figure 3:
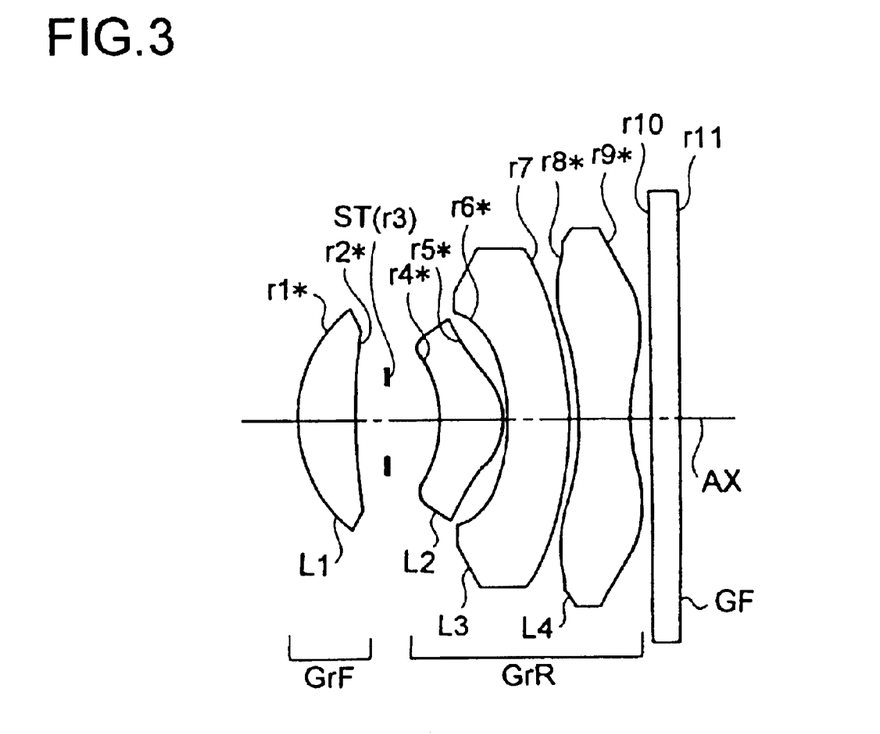
FIG. 3 is a lens construction diagram of a third embodiment (Example 3) of the invention.
Figure 4:
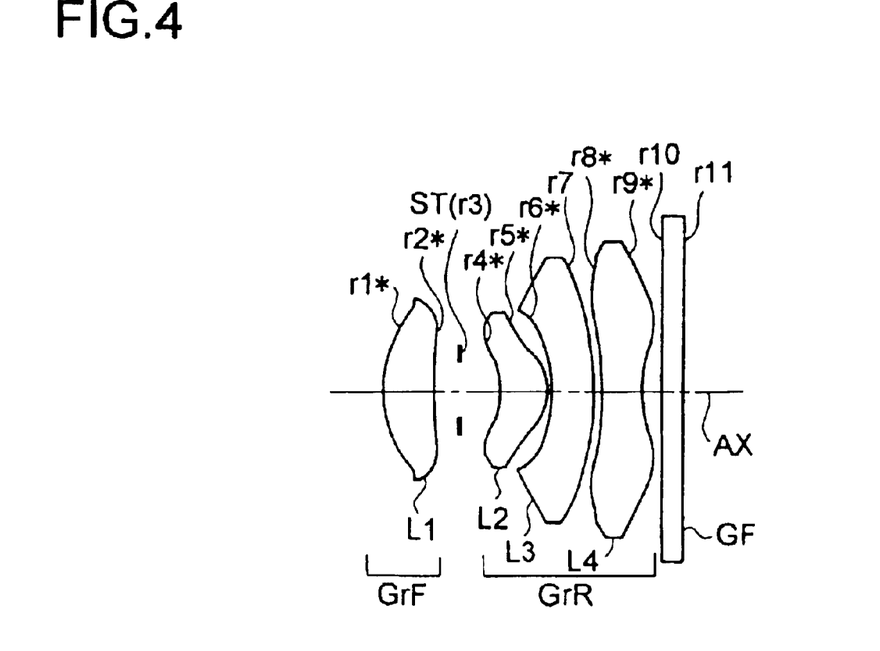
FIG. 4 is a lens construction diagram of a fourth embodiment (Example 4) of the invention.

Hereinafter, taking lens systems embodying the present invention will be described with reference to the drawings. FIGS. 1 to 4 show the lens constructions of a first to a fourth embodiment, respectively, of the invention, as seen in an optical section. The taking lens systems of these embodiments are all single-focal-length lens systems designed for image taking purposes (for example, in a digital camera), i.e., for forming an optical image on a solid-state image sensor (for example, a CCD). In all the embodiments, the taking lens system is composed of, from the object side thereof, a front lens unit GrF having a positive optical power, an aperture stop ST, and a rear lens unit GrR having a negative or positive optical power, and has a glass filter GF, having parallel flat surfaces and corresponding to an optical low-pass filter or the like, arranged on the image side thereof. The front lens unit GrF is composed solely of a first lens element L1, which is a positive lens element, and the rear lens unit GrR is composed of three lens elements, namely, from the object side thereof, a second lens element L2, which is a positive lens element, a third lens element L3, which is a negative lens element, and a fourth lens element L4, which is a negative lens element. That is, in all the embodiments, the taking lens system is composed of four lens elements, namely, from the object side thereof, a first lens element L1 having a positive optical power, an aperture stop ST, a second lens element L2 having a positive optical power, a third lens element L3 having a negative optical power, and a fourth lens element L4 having a negative optical power. In each lens construction diagram (FIGS. 1 to 4), ri (i=1, 2, 3, . . . ) represents the i-th surface from the object side, and a surface of which the symbol ri is marked with an asterisk (*) is an aspherical surface.

The lens construction of each embodiment will be described in more detail below. In the first to third embodiments, the first lens element L1 is a glass lens element having a meniscus shape convex to the object side and having a positive optical power, the second lens element L2 is a plastic lens element having a meniscus shape convex to the image side and having a positive optical power, the third lens element L3 is a plastic lens element having a meniscus shape convex to the image side and having a negative optical power, and the fourth lens element L4 is a plastic lens element having a biconcave shape and having a negative optical power. Here, the front lens unit GrF has a positive optical power, and the rear lens unit GrR has a negative optical power. In the fourth embodiment, the first lens element L1 is a glass lens element having a biconvex shape and having a positive optical power, the second lens element L2 is a plastic lens element having a meniscus shape convex to the image side and having a positive optical power, the third lens element L3 is a plastic lens element having a meniscus shape convex to the image side and having a negative optical power, and the fourth lens element L4 is a plastic lens element having a biconcave shape and having a negative optical power. Here, both the front lens unit GrF and the rear lens unit GrR have a positive optical power.

Thus, in all the embodiments, a four-lens-element construction is adopted by providing, from the object side, a positive lens element convex to the object side, an aperture stop ST, a positive meniscus lens element convex to the image side, a negative meniscus lens element convex to the image side, and a negative lens element concave to the image side and having an aspherical surface at least on the image side thereof. This helps make the taking lens system compact and low-cost while achieving high optical performance and a proper exit pupil position. Moreover, in all the embodiments, glass and plastic lens elements are arranged appropriately; specifically, only the first lens element L1 is a glass lens element and all the other lens elements L2 to L4 are plastic lens elements. This helps realize a low-cost, compact taking lens system that offers satisfactory optical performance. Moreover, by using a glass lens element only as the first lens element L1, it is possible to alleviate degradation of performance resulting from variation in temperature and thereby obtain satisfactory optical performance over a wide range of temperatures.

In any of the embodiments, where a four-lens-element construction is adopted with a positive-positive-negative-negative optical power arrangement (an optical power is a quantity given as the reciprocal of a focal length), to effectively achieve a satisfactory balance between the exit pupil position, optical performance, cost, compactness, productivity, and other factors required in a taking lens system for use with a solid-state image sensor, it is preferable to fulfill the conditions described below. First, the conditional formulae that should preferably be fulfilled by the taking lens system of each embodiment, i.e., the conditional formulae of which the fulfillment is preferable in a taking lens system of a type like that of each embodiment, will be described. It is to be noted, however, that it is not necessary to fulfill all the conditional formulae described below simultaneously; that is, the fulfillment of whichever of those conditions are appropriate in a given optical construction provides the corresponding benefits and advantages. Needless to say, it is preferable that as many of the conditions as possible be fulfilled from the viewpoint of optical performance, miniaturization, production and assembly, and other factors.

It is preferable that conditional formula (1) below be fulfilled.

$$0.5 < f/f1 < 1.6 \tag{1}$$

where f represents the focal length of the entire taking lens system; and f1 represents the focal length of the first lens element L1.

Conditional formula (1) defines the conditional range that should preferably be fulfilled by the first lens element L1 mainly to achieve a proper balance between the total length and the produced aberrations. Transgressing the lower limit of conditional formula (1) is advantageous for aberration correction, but leads to an unduly great total length. By contrast, transgressing the upper limit of conditional formula (1) is advantageous for reducing the total length, but leads to unduly large aberrations, in particular in terms of distortion and curvature of field. Conditional formula (1) also defines a condition that should preferably be fulfilled by the glass lens element used as the first lens element L1 to achieve a proper balance between temperature-related variation in performance and the produced aberrations. Transgressing the lower limit of conditional formula (1) results in unduly large temperature-related variation in performance. By contrast, transgressing the upper limit of conditional formula (1), while helping reduce temperature-related variation in performance, leads to unduly large distortion and curvature of field.

It is further preferable that conditional formula (1a) below be fulfilled, and it is particularly preferable that conditional formula (1b) below be fulfilled. Conditional formulae (1a) and (1b) define further preferable conditional ranges within that defined by conditional formula (1) above from the aforementioned and other viewpoints.

$$0.6 < f/f1 < 1.4 \quad (1a)$$

$$0.8 < f/f1 < 1.2 \quad (1b)$$

In a taking lens system like those of the embodiments that is composed of a front lens unit GrF, which is composed solely of a first lens element L1 having a positive optical power, an aperture stop ST, and a rear lens unit GrR, which is composed of three lens elements, namely a second to a fourth lens element L2 to L4 having a positive, a negative, and a negative optical power, respectively, it is preferable that conditional formula (2) below be fulfilled.

$$-0.9 < f/fR < 0.4 \quad (2)$$

where f represents the focal length of the entire taking lens system; and fR represents the focal length of the rear lens unit GrR.

Conditional formula (2) defines the conditional range that should preferably be fulfilled by the rear lens unit GrR mainly to achieve a proper balance between the total length and the produced aberrations. Transgressing the upper limit of conditional formula (2) is advantageous for aberration correction, but leads to an unduly great total length. By contrast, transgressing the lower limit of conditional formula (2) is advantageous for reducing the total length, but leads to unduly large aberrations, in particular in terms of distortion and curvature of field.

It is further preferable that conditional formula (2a) below be fulfilled, and it is particularly preferable that conditional formula (2b) below be fulfilled. Conditional formulae (2a) and (2b) define further preferable conditional ranges within that defined by conditional formula (2) above from the aforementioned and other viewpoints.

$$-0.7 < f/fR < 0.1 \quad (2a)$$

$$-0.5 < f/fR < 0.03 \quad (2b)$$

It is preferable that conditional formula (3) below be fulfilled.

$$0.05 < T4/f < 0.4 \quad (3)$$

where

T4 represents the axial thickness of the fourth lens element L4; and f represents the focal length of the entire taking lens system.

Conditional formula (3) defines the conditional range that should preferably be fulfilled by the fourth lens element L4 mainly to achieve a proper balance between the produced curvature of field and the productivity of the lens element. Transgressing the upper limit of conditional formula (3) makes it difficult to satisfactorily correct curvature of field. By contrast, transgressing the lower limit of conditional formula (3) makes the lens element so thick that it cannot be produced.

It is further preferable that conditional formula (3a) below be fulfilled, and it is particularly preferable that conditional formula (3b) below be fulfilled. Conditional formulae (3a) and (3b) define further preferable conditional ranges within that defined by conditional formula (3) above from the aforementioned and other viewpoints.

$$0.07 < T4/f < 0.3 \quad (3a)$$

$$0.1 < T4/f < 0.2 \quad (3b)$$

It is preferable that conditional formula (4) below be fulfilled.

$$|f/f3| < 0.6 \quad (4)$$

where f represents the focal length of the entire taking lens system; and f3 represents the focal length of the third lens element L3.

Conditional formula (4) defines the conditional range that should preferably be fulfilled by the third lens element L3 to achieve a proper balance between the produced coma and curvature of field. Outside the conditional range defined by conditional formula (4), too large coma and curvature of field are produced, adversely affecting the peripheral portion of the image formed.

It is further preferable that conditional formula (4a) below be fulfilled, and it is particularly preferable that conditional formula (4b) below be fulfilled. Conditional formulae (4a) and (4b) define further preferable conditional ranges within that defined by conditional formula (4) above from the aforementioned and other viewpoints.

$$|f/f3| < 0.4 \quad (4a)$$

$$|f/f3| < 0.3 \quad (4b)$$

As in any of the embodiments, it is preferable that all the lens elements each have an aspherical surface at least on one side thereof. Giving at least one aspherical surface to each of the first to fourth lens elements L1 to L4 is highly effective in correcting spherical aberration, coma, and distortion. In all the embodiments, the taking lens system is composed solely of refractive lens elements, which deflect incident light by refraction (i.e. lens elements of the type that deflects light at the interface between two media having different refractive indices). It is possible, however, to replace any of these lens elements with a lens element of any other type, for example, a diffractive lens element, which deflects incident light by diffraction, or a refractive/diffractive hybrid lens element, which deflects incident light by diffraction and refraction combined together, or a gradient index lens element, which deflects incident light with varying refractive indices distributed within a medium. Among these types, gradient index lens elements, which have varying refractive indices distributed within a medium, are expensive because of the complicated fabrication process they require. Therefore, in a taking lens system embodying the invention, it is preferable to use lens elements formed out of a uniform material as all of the lens elements L1 to L4.

As required, in addition to the aperture stop ST, a beam restricting plate or the like for cutting unnecessary light may be arranged. As required, a kind of prism (for example, a rectangular prism), a kind of mirror (for example, a flat mirror), or the like may be arranged in the optical path so as to bend, with a surface thereof having no optical power (for example, a reflective, refractive, or diffractive surface) the optical path in front of, behind, or in the middle of the taking lens system (for example, the beam may be reflected so that the optical axis AX is bent by about 90 degrees). Where to bend the optical path may be determined to suit particular needs. By bending the optical path appropriately, it is possible to make apparently slim and compact the digital input apparatus (such as a digital camera) in which the taking lens system is incorporated.

The taking lens systems of the embodiments are all suitable as compact taking lens systems for use in digital input apparatuses, and, by combining one of those taking lens systems with an optical low-pass filter and a solid-state image sensor, it is possible to build a taking lens device that takes in an image of a subject optically and outputs it as an electrical signal. A taking lens device is used as the main component of a camera that is used to take a still or moving picture of a subject, examples of such cameras including digital cameras, video cameras, and cameras incorporated in or externally fitted to digital video units, personal computers, mobile computers, cellular phones, personal digital assistants (PDAs), peripheral apparatuses therefor (for example, mouses, scanners, printers, and other digital input/output apparatuses), and the like. A taking lens device is composed of, for example, from the object (subject) side, a taking lens system for forming an optical image of a subject, an optical filter such as an optical low-pass filter or an infrared cut filter, and a solid-state image sensor for converting the optical image formed by the taking lens system into an electrical signal.

Thus, the embodiments described hereinbefore include inventions (I) to (IV) having features as noted below, and, with those features, it is possible to realize high-optical-performance, low-cost, compact taking lens devices. By incorporating such a taking lens device in a digital camera or the like, it is possible to enhance the performance and functionality of the camera, and to reduce the costs and size thereof (I) A taking lens device comprising a taking lens system for forming an optical image and an image sensor for converting the optical image formed by the taking lens system into an electrical signal, wherein the taking lens system is composed of four lens elements, namely, from the object side, a first lens element having a positive optical power, an aperture stop, a second lens element having a positive optical power, a third lens element having a negative optical power, and a fourth lens element having a negative optical power, and at least one of conditional formulae (1), (1a), (1b), (3), (3a), (3b), (4), (4a), and (4b) noted earlier is fulfilled.

(II) A taking lens device comprising a taking lens system for forming an optical image and an image sensor for converting the optical image formed by the taking lens system into an electrical signal, wherein the taking lens system is composed of, from the object side, a front lens unit having a positive optical power, an aperture stop, and a rear lens unit, the front lens unit being composed solely of a first lens element having a positive optical power, the rear lens unit being composed of three lens element, namely, from the object side, a second lens element having a positive optical power, a third lens element having a negative optical power, and a fourth lens element having a negative optical power, and at least one of conditional formulae (2), (2a), and (2b) noted earlier is fulfilled.

(III) A taking lens device comprising a taking lens system for forming an optical image and an image sensor for converting the optical image formed by the taking lens system into an electrical signal, wherein the taking lens system is composed of four lens elements, namely, from the object side, a first lens element having a positive optical power, an aperture stop, a second lens element having a positive optical power, a third lens element having a negative optical power, and a fourth lens element having a negative optical power, the first lens element being a positive lens element convex to the object side, the second lens element being a positive meniscus lens element convex to an image side, the third lens element being a negative meniscus lens element convex to the image side, the fourth lens element being a negative lens element concave to the image side and having an aspherical surface at least on the image side thereof.

(IV) A taking lens device as described in one of (I) to (III) above, wherein only the first lens element is a glass lens element and all the other lens elements are plastic lens element.

Used as the image sensor is, for example, a solid-state image sensor such as a CCD or CMOS (complementary metal oxide semiconductor) sensor having a plurality of pixels. The optical image formed by the taking lens system is converted into an electrical signal by the solid-state image sensor. The optical image to be formed by the taking lens system passes through the optical low-pass filter having a predetermined cutoff frequency characteristic that depends on the pixel pitch of the solid-state image sensor, and meanwhile the optical image has its spatial frequency characteristic so adjusted as to minimize so-called aliasing noise generated when the optical image is converted into an electric signal. The signal produced by the solid-state image sensor is subjected to predetermined digital image processing, image compression processing, and the like as required, and is recorded in a memory (such as a semiconductor memory or an optical disk) as a digital video signal; in some cases, the signal is transferred to another apparatus through a cable or after being converted into an infrared signal. In the embodiments, a glass filter GF is used as the optical low-pass filter disposed between the last surface of the taking lens system and the solid-state image sensor. It is possible, however, to use instead an optical low-pass filter of any other type that suits the digital input apparatus in which the taking lens system is incorporated. For example, it is possible to use a birefringence-type low-pass filter made of quartz or the like having an appropriately aligned crystal axis, a phase-type low-pass filter that achieves the required optical cut-off frequency characteristics by exploiting diffraction, or a low-pass filter of any other type.

EXAMPLES

Hereinafter, practical examples of taking lens systems embodying the present invention will be presented with reference to their construction data and other data. Tables 1 to 4 show the construction data of Examples 1 to 4, respectively. Examples 1 to 4 correspond to the first to fourth embodiments described hereinabove. Thus, the lens construction diagrams (FIGS. 1 to 4) of the first to fourth embodiments also show the lens constructions of Examples 1 to 4, respectively. In the construction data of each example, ri (i=1, 2, 3, ...) represents the radius of curvature (mm) of the i-th surface from the object side, di (i=1, 2, 3, ...) represents the i-th axial distance (mm) from the object side, and Ni (i=1, 2, 3, ...) and vi (i=1, 2, 3, ...) respectively represent the refractive index (Nd) for the d-line and the Abbe number (vd) of the i-th optical element from the object side. Shown together with these data are the focal length (f, mm) of the taking lens system as a whole and the f-number (FNO). Table 5 shows the values of the conditional formulae as actually observed in Examples 1 to 4.

A surface of which the radius of curvature ri is marked with an asterisk (*) is a refractive optical surface having an aspherical shape or a surface that exerts a refractive effect equivalent to that of an aspherical surface. The surface shape of such an aspherical surface is defined by formula (AS) below. The aspherical surface data of the aspherical surfaces used in each example are also shown together with the other data mentioned above.

$$X(H) = (C0 \cdot H^2)/(1+\sqrt{1-\epsilon \cdot C0^2 \cdot H^2}) + \Sigma(Ai \cdot H^i) \quad (AS)$$

where

X(H) represents the displacement along the optical axis AX at the height H (relative to the vertex);

H represents the height in a direction perpendicular to the optical axis AX;

C0 represents the paraxial curvature (=the reciprocal of the radius of curvature);

$\epsilon$ represents the quadric surface parameter; and

Ai represents the aspherical surface coefficient of i-th order (the data are omitted if Ai=0).

Figures 5A, 5B:
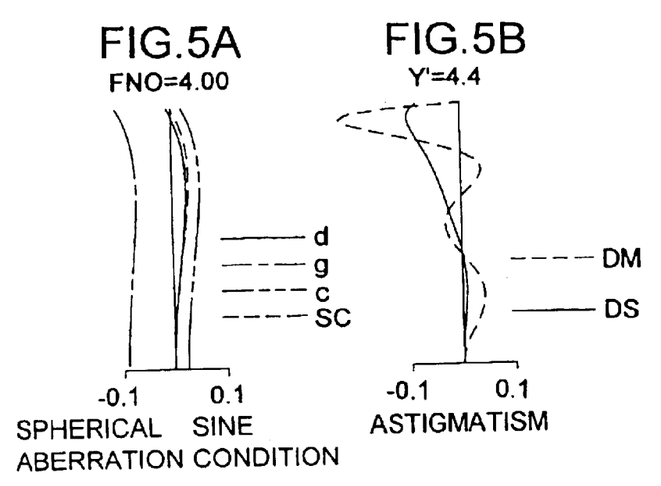
FIGS. 5A to 5C are aberration diagrams of Example 1.
Figure 5C:
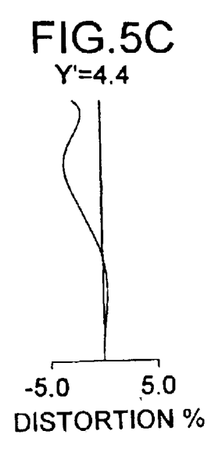
Figures 6A, 6B:
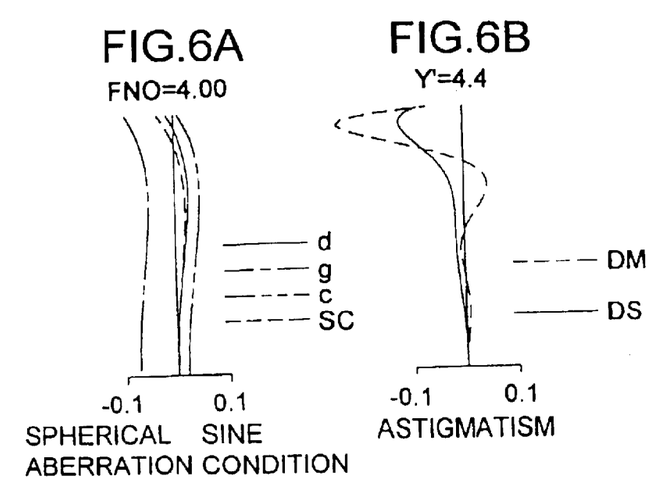
FIGS. 6A to 6C are aberration diagrams of Example 2.
Figure 6C:
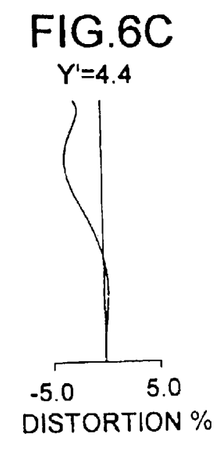
Figures 7A, 7B:
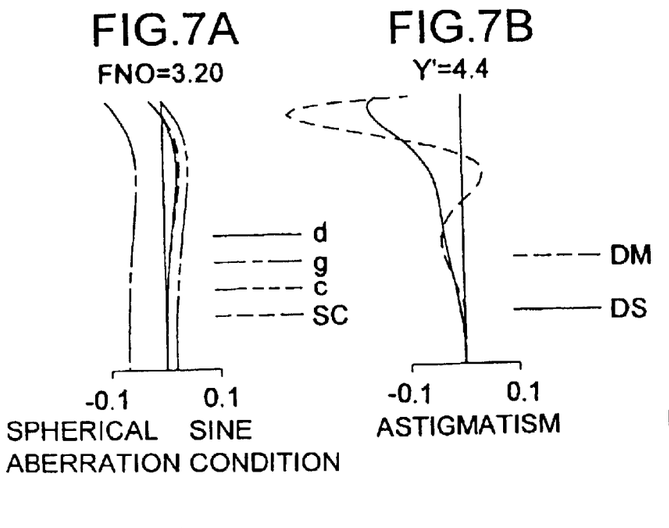
FIGS. 7A to 7C are aberration diagrams of Example 3.
Figure 7C:
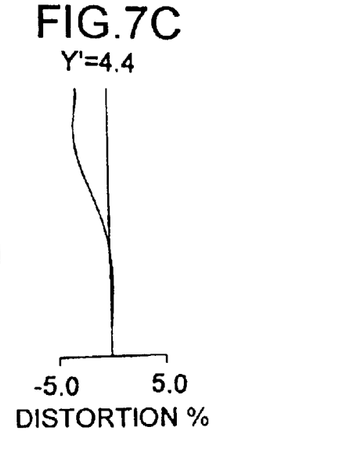
Figures 8A, 8B:
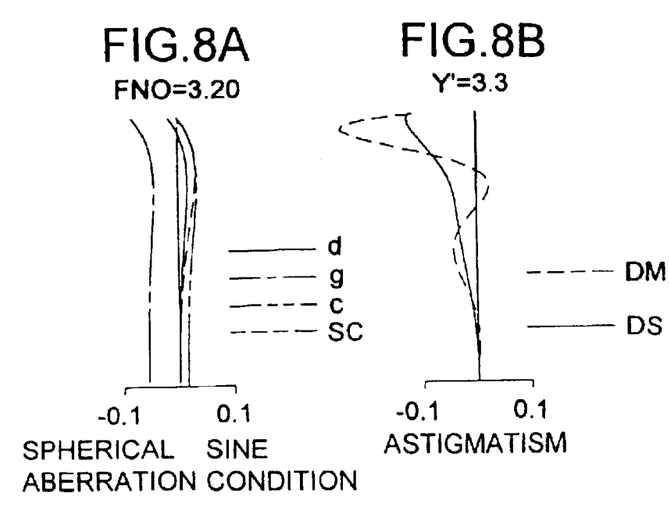
FIGS. 8A to 8C are aberration diagrams of Example 4.
Figure 8C:
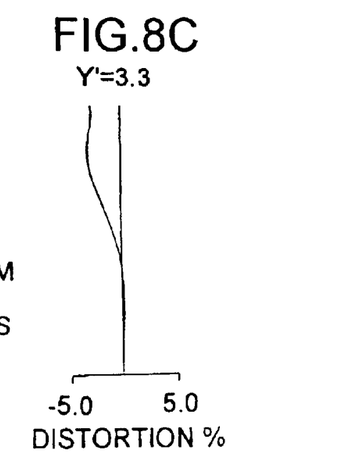

FIGS. 5A to 5C, 6A to 6C, 7A to 7C, and 8A to 8C are aberration diagrams of Examples 1 to 4, respectively. Of these aberration diagrams, FIGS. 5A, 6A, 7A, and 8A show spherical aberration and sine condition, FIGS. 5B, 6B, 7B, and 8B show astigmatism, and FIGS. 5C, 6C, 7C, and 8C show distortion, with FNO representing the f-number and Y' representing the maximum image height (mm). In the diagrams showing spherical aberration, the solid line (d), dash-and-dot line (g), and dash-dot-dot line (c) represent the spherical aberration (mm) observed for the d-, g-, and c-lines, respectively, and the broken line (SC) represents the deviation (mm) from the sine condition. In the diagrams showing astigmatism, the broken line (DM) and the solid line (DS) represent the astigmatism (mm) observed for the d-line on the meridional and sagittal planes, respectively. In the diagrams showing distortion, the solid line represents the distortion (%) observed for the d-line.

As described above, according to the present invention, it is possible to realize a taking lens system for use with a solid-state image sensor which is low-cost and compact but which nevertheless offers satisfactory optical performance. By incorporating a taking lens system according to the invention in a digital input apparatus such as a camera incorporated in a cellular phone or a digital camera, it is possible to enhance the performance and functionality of the apparatus, and to reduce the costs and size thereof.

TABLE 1

Example 1
f = 7.277, FNO = 4.00

| Radius of Curvature | Axial Distance | Refractive Index | Abbe Number |
|---|---|---|---|
| r1* = 3.548 | | | |
| | d1 = 1.161 | N1 = 1.58913 | v1 = 61.28 (L1) |
| r2* = 16.802 | | | |
| | d2 = 0.593 | | |
| r3 = ∞ (ST) | | | |
| | d3 = 1.343 | | |
| r4* = −3.817 | | | |
| | d4 = 1.377 | N2 = 1.53048 | v2 = 55.72 (L2) |
| r5* = −1.576 | | | |
| | d5 = 0.447 | | |
| r6* = −2.730 | | | |
| | d6 = 1.686 | N3 = 1.58340 | v3 = 30.23 (L3) |
| r7 = −4.280 | | | |
| | d7 = 0.100 | | |
| r8 = −5.779 | | | |
| | d8 = 0.833 | N4 = 1.53048 | v4 = 55.72 (L4) |
| r9* = 5.219 | | | |
| | d9 = 0.500 | | |
| r10 = ∞ | | | |
| | d10 = 0.700 | N5 = 1.51680 | v5 = 64.20 (GF) |
| r11 = ∞ | | | |

Aspherical Surface Data of Surface r1
$\epsilon = 0.77563$, $A4 = 0.25359 \times 10^{-2}$, $A6 = 0.42096 \times 10^{-3}$,
$A8 = 0.12178 \times 10^{-4}$, $A10 = 0.88312 \times 10^{-5}$
Aspherical Surface Data of Surface r2
$\epsilon = 0.16000 \times 10^2$, $A4 = 0.60134 \times 10^{-2}$,
$A6 = -0.12266 \times 10^{-2}$, $A8 = 0.58101 \times 10^{-3}$,
$A10 = -0.11992 \times 10^{-3}$
Aspherical Surface Data of Surface r4
$\epsilon = 0.20000 \times 10$, $A4 = -0.23442 \times 10^{-1}$,
$A6 = -0.78672 \times 10^{-2}$, $A8 = 0.75751 \times 10^{-2}$,
$A10 = -0.35641 \times 10^{-3}$
Aspherical Surface Data of Surface r5
$\epsilon = 0.26692$, $A4 = -0.38537 \times 10^{-2}$,
$A6 = 0.64572 \times 10^{-3}$, $A8 = -0.20007 \times 10^{-3}$,
$A10 = 0.48166 \times 10^{-3}$
Aspherical Surface Data of Surface r6
$\epsilon = 0.19644 \times 10^{-1}$, $A4 = -0.20508 \times 10^{-1}$,
$A6 = 0.58512 \times 10^{-2}$, $A8 = -0.43953 \times 10^{-4}$,
$A10 = -0.11200 \times 10^{-3}$
Aspherical Surface Data of Surface r9
$\epsilon = -0.24561 \times 10$, $A4 = -0.14117 \times 10^{-1}$,
$A6 = 0.65211 \times 10^{-3}$, $A8 = -0.11832 \times 10^{-4}$,
$A10 = -0.56001 \times 10^{-6}$

TABLE 2

Example 2
f = 7.224, FNO = 4.00

| Radius of Curvature | Axial Distance | Refractive Index | Abbe Number |
|---|---|---|---|
| r1* = 3.085 | | | |
| | d1 = 1.254 | N1 = 1.48749 | v1 = 70.44 (L1) |
| r2* = 132.361 | | | |
| | d2 = 0.519 | | |
| r3 = ∞ (ST) | | | |
| | d3 = 1.333 | | |
| r4* = −2.840 | | | |
| | d4 = 1.370 | N2 = 1.53048 | v2 = 55.72 (L2) |
| r5* = −1.406 | | | |
| | d5 = 0.215 | | |
| r6* = −2.977 | | | |
| | d6 = 1.421 | N3 = 1.58340 | v3 = 30.23 (L3) |
| r7 = −4.231 | | | |
| | d7 = 0.200 | | |
| r8* = −3.893 | | | |
| | d8 = 0.929 | N4 = 1.53048 | v4 = 55.72 (L4) |

TABLE 2-continued

Example 2
f = 7.224, FNO = 4.00

| Radius of Curvature | Axial Distance | Refractive Index | Abbe Number |
|---|---|---|---|
| r9* = 4.977 | | | |
| | d9 = 0.500 | | |
| r10 = ∞ | | | |
| | d10 = 0.700 | N5 = 1.51680 | ν5 = 64.20 (GF) |
| r11 = ∞ | | | |

Aspherical Surface Data of Surface r1
$\epsilon = 0.53903$, $A4 = 0.16932 \times 10^{-2}$, $A6 = -0.11741 \times 10^{-3}$,
$A8 = 0.57949 \times 10^{-4}$, $A10 = -0.71896 \times 10^{-4}$
Aspherical Surface Data of Surface r2
$\epsilon = -0.14000 \times 10^{2}$, $A4 = 0.27344 \times 10^{-2}$,
$A6 = -0.26419 \times 10^{-2}$, $A8 = -0.75325 \times 10^{-4}$,
$A10 = 0.73080 \times 10^{-4}$
Aspherical Surface Data of Surface r4
$\epsilon = 0.20000 \times 10$, $A4 = -0.31677 \times 10^{-1}$,
$A6 = -0.75942 \times 10^{-2}$, $A8 = 0.91685 \times 10^{-2}$,
$A10 = 0.41558 \times 10^{-3}$
Aspherical Surface Data of Surface r5
$\epsilon = 0.24552$, $A4 = -0.52179 \times 10^{-2}$,
$A6 = 0.25889 \times 10^{-2}$, $A8 = -0.68847 \times 10^{-4}$,
$A10 = 0.47898 \times 10^{-3}$
Aspherical Surface Data of Surface r6
$\epsilon = 0.40102 \times 10^{-1}$, $A4 = -0.18898 \times 10^{-1}$,
$A6 = 0.54964 \times 10^{-2}$, $A8 = 0.32997 \times 10^{-3}$,
$A10 = -0.26481 \times 10^{-3}$
Aspherical Surface Data of Surface r8
$\epsilon = 0.10000 \times 10$, $A4 = 0.48378 \times 10^{-3}$,
$A6 = 0.60634 \times 10^{-3}$, $A8 = 0.19793 \times 10^{-4}$,
$A10 = -0.16558 \times 10^{-5}$
Aspherical Surface Data of Surface r9
$\epsilon = -0.60000 \times 10$, $A4 = -0.16306 \times 10^{-1}$,
$A6 = 0.98140 \times 10^{-3}$, $A8 = -0.41108 \times 10^{-4}$,
$A10 = 0.65479 \times 10^{-6}$

TABLE 3

Example 3
f = 7.223, FNO = 3.20

| Radius of Curvature | Axial Distance | Refractive Index | Abbe Number |
|---|---|---|---|
| r1* = 3.658 | | | |
| | d1 = 1.456 | N1 = 1.48749 | ν1 = 70.44 (L1) |
| r2* = 73.204 | | | |
| | d2 = 0.709 | | |
| r3 = ∞ (ST) | | | |
| | d3 = 1.347 | | |
| r4* = −3.303 | | | |
| | d4 = 1.559 | N2 = 1.53048 | ν2 = 55.72 (L2) |
| r5* = −1.519 | | | |
| | d5 = 0.100 | | |
| r6* = −5.135 | | | |
| | d6 = 1.559 | N3 = 1.58340 | ν3 = 30.23 (L3) |
| r7 = −8.750 | | | |
| | d7 = 0.200 | | |
| r8* = −7.043 | | | |
| | d8 = 1.264 | N4 = 1.53048 | ν4 = 55.72 (L4) |
| r9* = 3.768 | | | |
| | d9 = 0.500 | | |
| r10 = ∞ | | | |
| | d10 = 0.700 | N5 = 1.51680 | ν5 = 64.20 (GF) |
| r11 = ∞ | | | |

Aspherical Surface Data of Surface r1
$\epsilon = 0.71501$, $A4 = 0.28518 \times 10^{-2}$, $A6 = -0.17675 \times 10^{-3}$,
$A8 = 0.14775 \times 10^{-3}$, $A10 = -0.18376 \times 10^{-4}$
Aspherical Surface Data of Surface r2
$\epsilon = -0.16000 \times 10^{2}$, $A4 = 0.63737 \times 10^{-2}$,
$A6 = -0.12019 \times 10^{-2}$, $A8 = 0.11025 \times 10^{-3}$,
$A10 = -0.14631 \times 10^{-4}$
Aspherical Surface Data of Surface r4

TABLE 3-continued

Example 3
f = 7.223, FNO = 3.20

| Radius of Curvature | Axial Distance | Refractive Index | Abbe Number |
|---|---|---|---|

$\epsilon = 0.17392 \times 10$, $A4 = -0.19887 \times 10^{-1}$,
$A6 = -0.18654 \times 10^{-1}$, $A8 = 0.10823 \times 10^{-1}$,
$A10 = -0.98268 \times 10^{-3}$
Aspherical Surface Data of Surface r5
$\epsilon = 0.25841$, $A4 = -0.41793 \times 10^{-3}$,
$A6 = -0.20223 \times 10^{-3}$, $A8 = -0.33463 \times 10^{-3}$,
$A10 = 0.23695 \times 10^{-3}$
Aspherical Surface Data of Surface r6
$\epsilon = 0.00000$, $A4 = -0.14443 \times 10^{-1}$,
$A6 = 0.39292 \times 10^{-2}$, $A8 = -0.46118 \times 10^{-4}$,
$A10 = -0.77163 \times 10^{-4}$
Aspherical Surface Data of Surface r8
$\epsilon = 0.10000 \times 10$, $A4 = 0.39723 \times 10^{-3}$,
$A6 = 0.28397 \times 10^{-3}$, $A8 = 0.18192 \times 10^{-5}$,
$A10 = -0.45178 \times 10^{-6}$
Aspherical Surface Data of Surface r9
$\epsilon = -0.55782 \times 10$, $A4 = -0.11687 \times 10^{-1}$,
$A6 = 0.76776 \times 10^{-3}$, $A8 = -0.49279 \times 10^{-4}$,
$A10 = 0.13179 \times 10^{-5}$

TABLE 4

Example 4
f = 5.457, FNO = 3.20

| Radius of Curvature | Axial Distance | Refractive Index | Abbe Number |
|---|---|---|---|
| r1* = 3.253 | | | |
| | d1 = 1.288 | N1 = 1.48749 | ν1 = 70.44 (L1) |
| r2* = −86.056 | | | |
| | d2 = 0.579 | | |
| r3 = ∞ (ST) | | | |
| | d3 = 1.036 | | |
| r4* = −2.672 | | | |
| | d4 = 1.199 | N2 = 1.53048 | ν2 = 55.72 (L2) |
| r5* = −1.179 | | | |
| | d5 = 0.100 | | |
| r6* = −4.423 | | | |
| | d6 = 1.022 | N3 = 1.58340 | ν3 = 30.23 (L3) |
| r7 = −7.099 | | | |
| | d7 = 0.200 | | |
| r8* = −6.526 | | | |
| | d8 = 0.956 | N4 = 1.53048 | ν4 = 55.72 (L4) |
| r9* = 2.573 | | | |
| | d9 = 0.500 | | |
| r10 = ∞ | | | |
| | d10 = 0.500 | N5 = 1.51680 | ν5 = 64.20 (GF) |
| r11 = ∞ | | | |

Aspherical Surface Data of Surface r1
$\epsilon = 0.61954$, $A4 = 0.60178 \times 10^{-2}$, $A6 = -0.12105 \times 10^{-2}$,
$A8 = 0.86233 \times 10^{-3}$, $A10 = -0.15712 \times 10^{-3}$
Aspherical Surface Data of Surface r2
$\epsilon = -0.14000 \times 10^{2}$, $A4 = 0.15001 \times 10^{-1}$,
$A6 = -0.53033 \times 10^{-2}$, $A8 = 0.12331 \times 10^{-2}$,
$A10 = -0.29962 \times 10^{-3}$
Aspherical Surface Data of Surface r4
$\epsilon = 0.11867 \times 10$, $A4 = -0.37808 \times 10^{-1}$,
$A6 = -0.76004 \times 10^{-1}$, $A8 = 0.79954 \times 10^{-1}$,
$A10 = -0.14867 \times 10^{-1}$
Aspherical Surface Data of Surface r5
$\epsilon = 0.25855$, $A4 = 0.51279 \times 10^{-3}$,
$A6 = -0.23878 \times 10^{-2}$, $A8 = -0.21119 \times 10^{-2}$,
$A10 = 0.31651 \times 10^{-2}$
Aspherical Surface Data of Surface r6
$\epsilon = 0.69924$, $A4 = -0.37699 \times 10^{-1}$,
$A6 = 0.16425 \times 10^{-1}$, $A8 = -0.53665 \times 10^{-3}$,
$A10 = -0.77077 \times 10^{-3}$
Aspherical Surface Data of Surface r8
$\epsilon = 0.10000 \times 10$, $A4 = 0.22716 \times 10^{-3}$, TABLE 4-continued Example 4
f = 5.457, FNO = 3.20

| Radius of Curvature | Axial Distance | Refractive Index | Abbe Number |
|---|---|---|---|

A6 = 0.10393 × 10$^{-2}$, A8 = 0.34646 × 10$^{-5}$,
A10 = −0.42799 × 10$^{-5}$
Aspherical Surface Data of Surface r9
ε = −0.56964 × 10, A4 = −0.26810 × 10$^{-1}$,
A6 = 0.32076 × 10$^{-2}$, A8 = −0.37062 × 10$^{-3}$,
A10 = 0.17192 × 10$^{-4}$

TABLE 5

| | (1),(1a),(1b) f/f1 | (2),(2a),(2b) f/fR | (3),(3a),(3b) T4/f | (4),(4a),(4b) \|f1/f3\| |
|---|---|---|---|---|
| Example 1 | 0.98 | −0.20 | 0.11 | 0.34 |
| Example 2 | 1.12 | −0.48 | 0.13 | 0.24 |
| Example 3 | 0.92 | −0.12 | 0.17 | 0.29 |
| Example 4 | 0.84 | 0.02 | 0.18 | 0.23 |

What is claimed is:

1. A four-lens-element taking lens system for forming an image on a solid-state image sensor, comprising, from an object side:

a first lens element having a positive optical power;

an aperture stop;

a second lens element having a positive optical power;

a third lens element having a negative optical power; and a fourth lens element having a negative optical power, wherein the following condition is fulfilled:

$$0.5 < f/f1 < 1.6$$

where f represents a focal length of the entire taking lens system; and f1 represents a focal length of the first lens element.

2. A four-lens-element taking lens system for forming an image on a solid-state image sensor, comprising, from an object side:

a front lens unit having a positive optical power;

an aperture stop; and a rear lens unit, wherein the front lens unit is composed solely of a first lens element having a positive optical power, the rear lens unit is composed of, from the object side, a second lens element having a positive optical power, a third lens element having a negative optical power, and a fourth lens element having a negative optical power, and the following condition is fulfilled:

$$-0.9 < f/fR < 0.4$$

where f represents a focal length of the entire taking lens system; and fR represents a focal length of the rear lens unit.

3. A four-lens-element taking lens system for forming an image on a solid-state image sensor, comprising, from an object side:

a first lens element having a positive optical power;

an aperture stop;

a second lens element having a positive optical power;

a third lens element having a negative optical power; and a fourth lens element having a negative optical power, wherein the first lens element is a positive lens element convex to the object side, the second lens clement is a positive meniscus lens element convex to an image side, the third lens element is a negative meniscus lens element convex to the image side, and the fourth lens element is a negative lens element concave to the image side and having an aspherical surface at least on an image side thereof.

4. A taken lens system as claimed in claim 1, wherein only the first lens element is a glass lens element and all the other lens elements are plastic elements.

5. A taking lens system as claimed in claim 1, wherein the following condition is fulfilled:

$$0.05 < T4/f < 0.4$$

where

T4 represents an axial thickness of the fourth lens element; and represents a focal length of the entire taking lens system.

* * * * *